(12) United States Patent
Green

(10) Patent No.: US 8,122,751 B2
(45) Date of Patent: Feb. 28, 2012

(54) CLAMP AND REPAIR TOOL

(75) Inventor: Kenneth H. Green, Whitefish, MT (US)

(73) Assignee: Timberline Tool, L.L.C., Kalispell, MT (US)

( * ) Notice: Subject to any disclaimer, the term of this patent is extended or adjusted under 35 U.S.C. 154(b) by 23 days.

(21) Appl. No.: 11/866,706

(22) Filed: Oct. 3, 2007

(65) Prior Publication Data
US 2009/0173134 A1    Jul. 9, 2009

Related U.S. Application Data

(63) Continuation of application No. 10/926,366, filed on Aug. 25, 2004, now Pat. No. 7,337,648.

(60) Provisional application No. 60/498,612, filed on Aug. 28, 2003.

(51) Int. Cl.
*B21D 7/06* (2006.01)
*B21D 19/04* (2006.01)

(52) U.S. Cl. ............. 72/416; 72/451; 269/228; 269/268

(58) Field of Classification Search .................... 72/416, 72/409.19, 454, 451, 409.01, 409.12, 159; 269/268, 270, 228; 29/283, 237; 425/12, 425/14
See application file for complete search history.

(56) References Cited

U.S. PATENT DOCUMENTS
232,428 A    9/1880    Whiting
(Continued)

FOREIGN PATENT DOCUMENTS
DE    33 35 728 A1    4/1985
(Continued)

*Primary Examiner* — Debra Sullivan
(74) *Attorney, Agent, or Firm* — Dorsey & Whitney LLP; David E. Bruhn, Esq.

(57) ABSTRACT

A tool for gripping, clamping or holding an object, wherein the tool has a handle portion, a linkage portion and a working portion, and wherein the working portion includes two workpiece contacting surfaces, at least one of the surfaces shaped to generally conform to at least a portion of the outer surface of a workpiece to be clamped, gripped or held. In some embodiments, at least one of the workpiece contacting surfaces is adapted to provide a treatment to a workpiece being clamped, gripped or held.

11 Claims, 12 Drawing Sheets

U.S. PATENT DOCUMENTS

| | | | |
|---|---|---|---|
| 243,480 A | 6/1881 | Whiting | |
| 455,414 A | 7/1891 | Searle | |
| 458,176 A | 8/1891 | Lemp | |
| 1,100,067 A * | 6/1914 | Fish | 269/174 |
| 1,817,988 A | 8/1931 | Klamt | |
| 2,241,021 A * | 5/1941 | Riebe | 269/218 |
| 2,283,933 A | 5/1942 | Jones et al. | |
| 2,850,926 A | 9/1958 | Jobe | |
| 3,117,904 A * | 1/1964 | Black | 156/475 |
| 3,170,322 A | 2/1965 | Cavanaugh | |
| 3,266,287 A * | 8/1966 | Gill | 72/416 |
| 4,534,817 A | 8/1985 | O'Sullivan | |
| 4,574,610 A * | 3/1986 | Hull et al. | 72/370.23 |
| 4,582,292 A | 4/1986 | Glotzback et al. | |
| 4,650,236 A | 3/1987 | Haney et al. | |
| 4,900,078 A | 2/1990 | Bloch | |
| 4,943,684 A | 7/1990 | Kramer | |
| 5,107,095 A | 4/1992 | Derbyshire | |
| 5,119,665 A | 6/1992 | Stafford | |
| 5,382,313 A | 1/1995 | Eminger | |
| 5,971,378 A * | 10/1999 | Sweeney | 269/6 |
| 6,450,555 B1 | 9/2002 | Collister et al. | |
| 6,655,417 B2 | 12/2003 | Kurmis | |
| 6,707,007 B1 | 3/2004 | Siddoway | |
| 6,941,628 B1 | 9/2005 | Silverfox | |
| 7,337,648 B2 | 3/2008 | Green | |
| 2009/0050256 A1 | 2/2009 | Green | |

FOREIGN PATENT DOCUMENTS

| | | |
|---|---|---|
| EP | 0 532 391 A | 3/1993 |
| EP | 0 779 465 | 6/1997 |
| EP | 2 128 512 | 12/2009 |
| FR | 2 231 916 A | 12/1974 |
| FR | 2 613 811 | 10/1988 |
| FR | 2 728 494 | 6/1996 |
| JP | 60-110792 | 7/1985 |
| JP | 04-048406 | 4/1992 |
| WO | 2005/023494 | 3/2005 |
| WO | 2006083857 A2 | 8/2006 |

* cited by examiner

CLAMP AND REPAIR TOOL

CROSS REFERENCE TO RELATED APPLICATIONS

This application is a continuation of U.S. Utility application Ser. No. 10/926,366 field on Aug. 25, 2004 which claims priority to U.S. Provisional Patent Application, Ser. No. 60/498,612, filed on Aug. 28, 2003, the entire subject matters of which are incorporated herein by reference in their entireties.

BACKGROUND

The present invention relates to tools, including clamping, holding and gripping type tools. More specifically, the present invention relates to clamping, holding and gripping type tools, including such tools adapted to apply a treatment to a workpiece. In some embodiments, the treatment may be selected as suitable for the workpiece to be held, clamped or gripped and for the effect sought.

Various circumstances require a clamping tool. Repair, joining or sealing conduits, pipes and the like or other workpieces may be facilitated by clamping. Often, it is advantageous to pinch or otherwise block piping through which fluid is moving. For example, a utility crew may expose a portion of a natural gas line to perform maintenance or some other type of work. The utility crew cannot access the pipe without controlling the flow of the fluid, yet it may be difficult and disruptive to cease flow to that entire line. Thus, a clamp is often used to pinch the pipe or otherwise block the piping to stop fluid flow from that point forward.

Alternatively, a clamping tool may be used to clamp a pipe or conduit and apply a treatment thereto, without disturbing the flow of the fluid through the pipe or conduit.

A number of tools have been created to address these tasks. Some of the difficulties common to these tools include positioning of the tool around the pipe within a confined area, clamping the pipe without expelling it from the tool, providing a configuration offering sufficient force to compress the pipe, and providing a treatment to the pipe. These difficulties act individually and collectively to make it more difficult to use a clamping tool to secure a pipe or conduit and stop fluid flow through the pipe or conduit.

Generally, when securing a pipe to stop fluid flow through the pipe, only a small area is provided to work in. For example, a trench may be dug through the ground to reveal a small segment of the pipe. This can make it difficult to access the pipe, to reach the pipe (it may be several feet below ground level), and to engage the pipe with a tool. Because of the generally cylindrical shape of pipes, the strength of pipes, and the typical "scissoring" (i.e., angled closing) effect of clamping tools, pipes often become expelled from the clamping tool as the tool is actuated. That is, the pipe may not be easy to compress and, as the tool closes, the angled closing may cause the tool to disengage rather than clamping the pipe.

The small workspace, the resistance of the pipe to clamping, and the depth of the pipe in the ground make it difficult to provide a tool that an operator can use to develop sufficient force to apply a treatment to a pipe or to stop fluid flow through the pipe. Traditionally, when manually operated tools are needed to exert a greater force, a longer lever arm is provided. However, such a solution, in this context, is impractical for the reasons previously noted.

In some applications, it would be helpful if a radially directed force could be applied substantially completely and uniformly around a workpiece using a clamping or gripping type tool. This is difficult with a traditional scissor type jaw movement, or with clamp type tools having the typical generally flat jaw surfaces.

Thus, there exists a need to provide an improved clamping tool.

SUMMARY

A tool for gripping, clamping or holding an object, wherein the tool has a handle portion, a linkage portion and a working portion, and wherein the working portion includes two workpiece contacting surfaces, at least one of the surfaces being shaped to generally conform to at least a portion of the outer surface of a workpiece to be clamped, gripped or held. In some embodiments, at least one of the workpiece contacting surfaces is adapted to provide a treatment to a workpiece being clamped, gripped or held. For example, in some embodiments, a chemical may be applied to at least a portion of the workpiece while it is being held in the tool. In some embodiments, a collar, patch or other structure may be all or part of the treatment.

In one embodiment, the present invention provides a tool for gripping, clamping or holding an object, wherein the tool comprises a handle portion, a linkage portion and a working portion, and wherein the working portion comprises two workpiece contacting surfaces wherein the surfaces are shaped to generally conform to the outer surface of a workpiece to be clamped, gripped or held therein. In some embodiments, the workpiece contacting surfaces are adapted to provide a treatment to a workpiece being clamped, gripped or held. In some embodiments, at least a portion of the jaws remains generally parallel throughout the operation of the tool, and/or shaped portions of the jaws are generally reflective as the tool is operated.

In one embodiment, the present invention comprises a tool such as disclosed in a pending international application entitled "Clamping Tool", Int'l. Appln. No.: PCT/US02/16490, filed 23 May 2002, the disclosure of which application is incorporated herein by reference.

In one embodiment, the present invention provides a tool for gripping and/or clamping and/or holding an object, wherein the tool comprises a handle portion, a linkage portion and a working portion, and wherein the working portion comprises a double jaw design with two pivot pins per jaw. In use, the jaws generally remain parallel throughout the operation of the tool and move generally axially from a tube portion. When open, the jaws are spaced generally axially away from the remainder of the tool. The first jaw and second jaw are moveable towards one another. The first jaw and the second jaw each have a workpiece contacting surface that remains generally parallel to the other.

In one embodiment, the present invention is a tool comprising a clamp assembly having an opening; a first jaw coupled to the clamp assembly with a first four bar linkage, the first jaw being moveable within the opening; a second jaw being coupled to the clamp with a second four bar linkage, the second jaw being moveable within the opening; a first link being coupled between an actuating member and the first jaw; a second link being coupled between the actuating member and the second jaw, wherein selective actuation of the actuating member causes the first and the second link to move the first and the second jaw respectively, between an open and a closed position, wherein the first and the second jaws remain generally parallel to one another. Either or both of the first jaw and the second jaw may be provided with a workpiece contacting surface. If provided on both the first and the second jaw, the workpiece contacting surface remain generally parallel to the other.

In one embodiment, the present invention is a pipe clamping tool comprising a clamp assembly; a tube extending from the clamp assembly; a handle rotatably coupled with the tube; a first jaw coupled with the clamp assembly; a second jaw coupled with the clamp assembly, wherein rotational movement of the handle causes the first jaw to move towards the second jaw, while the first jaw and the second jaw remain generally parallel to one another. Either or both of the first jaw and the second jaw may be provided with a workpiece contacting surface. If provided on both the first and the second jaw, the workpiece contacting surface remain generally parallel to the other.

In one embodiment, the present invention is a pipe clamping tool comprising an extension tube; a threaded rod located within the extension tube and linearly moveable therein; a jaw base coupled to a first end of the threaded rod; a first jaw; a second jaw; and a linkage assembly coupled to the first jaw, the second jaw, the jaw base and the extension tube so that actuation of the threaded rod causes the first jaw to move towards the second jaw while the first jaw and the second jaw remain parallel to one another. Either or both of the first jaw and the second jaw may be provided with a workpiece contacting surface. If provided on both the first and the second jaw, the workpiece contacting surface remain generally parallel to the other.

In some embodiments, the working portion of the tool is adapted to contact a workpiece, for example, a tube or pipe, substantially completely around its outer diameter, and to apply a selected treatment to the workpiece. In some embodiments, a selected treatment applied by the tool to the workpiece may be chemical, thermochemical, electrical, or other suitable treatment or process. The treatment applied may be designed to have any desired effect on a workpiece, e.g., heating, melting, joining, patching, sealing, severing, compressing, deposition of a like or different material, etc.

In one embodiment, the present invention is a tool comprising a first jaw; a second jaw, wherein at least a portion of the first jaw and the second jaw are moveable towards one another while at least a portion of the jaws remains generally parallel, and wherein at least a portion of the jaws is configured to generally complement the shape of an intended workpiece. In some embodiments, at least one of the jaws of the tool of the present invention is adapted to apply a selected treatment to at least a portion of a workpiece.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the accompanying drawings and this description are to be regarded as illustrative, not restrictive.

DETAILED DESCRIPTION

With regard to fastening, mounting, attaching or connecting components of the present invention to form a tool as a whole, unless specifically described otherwise, such are intended to encompass conventional fasteners such as threaded connectors, snap rings, detent arrangements, rivets, toggles, pins, and the like. Components may also be connected by adhesives, glues, welding, ultrasonic welding, and friction fitting or deformation, if appropriate. In embodiments wherein electricity is involved, for example for electrical heating of a workpiece, suitable connections may be provided, along with a suitable power source or connectors for connecting to a power source. Unless specifically otherwise disclosed or taught, materials for making components of the present invention may be selected from appropriate materials such as metal, metallic alloys, vinyls, plastics and the like, and appropriate manufacturing or production methods including casting, pressing, extruding, molding and machining may be used.

Any references to front and back, right and left, top and bottom and upper and lower are intended for convenience of description, not to limit the present invention or its components to any one positional or spatial orientation.

The accompanying Figures illustrate a clamping tool including a clamping assembly coupled with a handle. The handle may be permanently coupled to the assembly or may be removable, and it may have a selected length.

Figure 1:
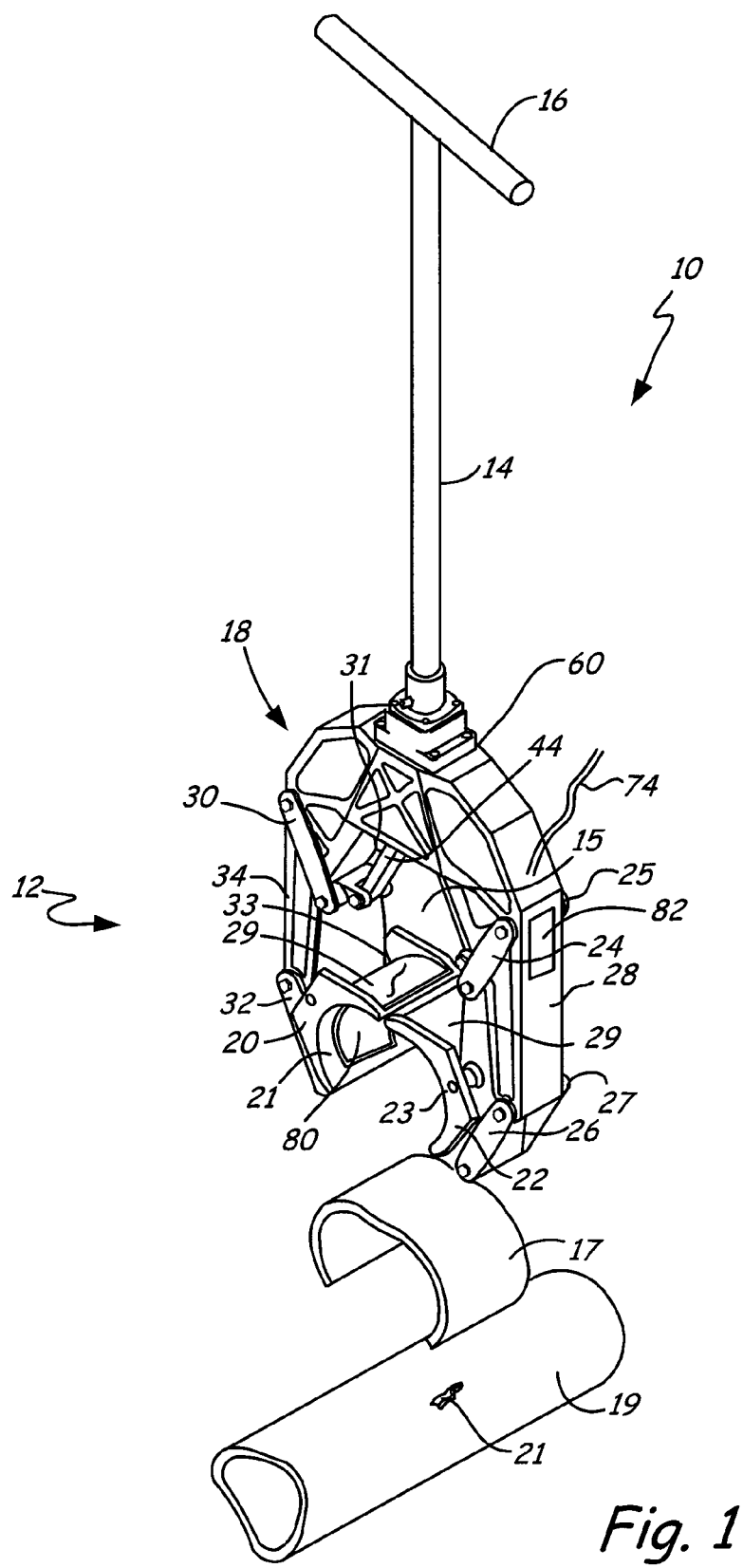
FIG. 1 is a perspective view of a clamping assembly of a clamping tool in accordance with one embodiment of the present invention in an open position.

FIG. 1 illustrates a clamping tool 10. The clamping tool 10 includes a clamping assembly 12 coupled with an extension tube 14. A handle 16 is rotatably coupled to the extension tube 14. In use, the handle 16 is rotated in one direction to cause the clamping assembly 12 to open and is rotated in the opposite direction to cause the clamping assembly 12 to close. Alternate handle configurations may be used in accordance with the present invention. That is, it is not necessary that the handle be rotatable. For example, the handle may be a push handle or a lever handle. As shown, the clamping assembly 12 is in an open position. The handle 16 may be permanently coupled with the extension tube 14 or may be removable. In one embodiment, extension tube 14 includes a standard sized bolt head so that a socket driver and socket can be use as the handle 16. Thus, different lengths of the handle 16 or extension tube 14 can be utilized depending upon the amount of force that will be required or the distances involved (e.g., the depth of a trench). As shown, the clamping tool 10 is positioned to apply a treatment 17 to a workpiece 19, the workpiece 19 having a gash 21 in the surface thereof.

Figure 2:
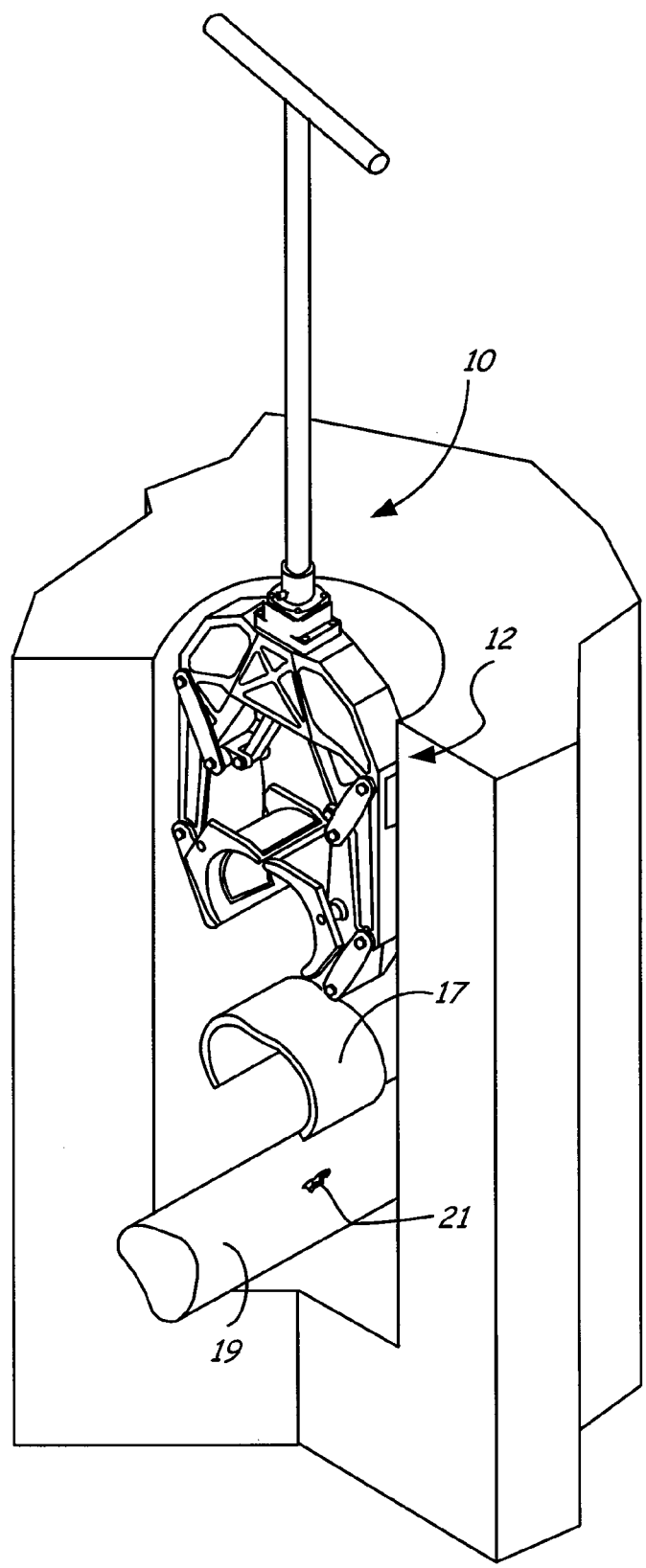
FIG. 2 is a perspective view of a clamping assembly of a clamping tool in accordance with one embodiment of the present invention in an open position being used in a narrow access.

FIG. 2 illustrates the clamping tool 10 of FIG. 1, also in a closed position, in use in a narrow space.

Figure 12:
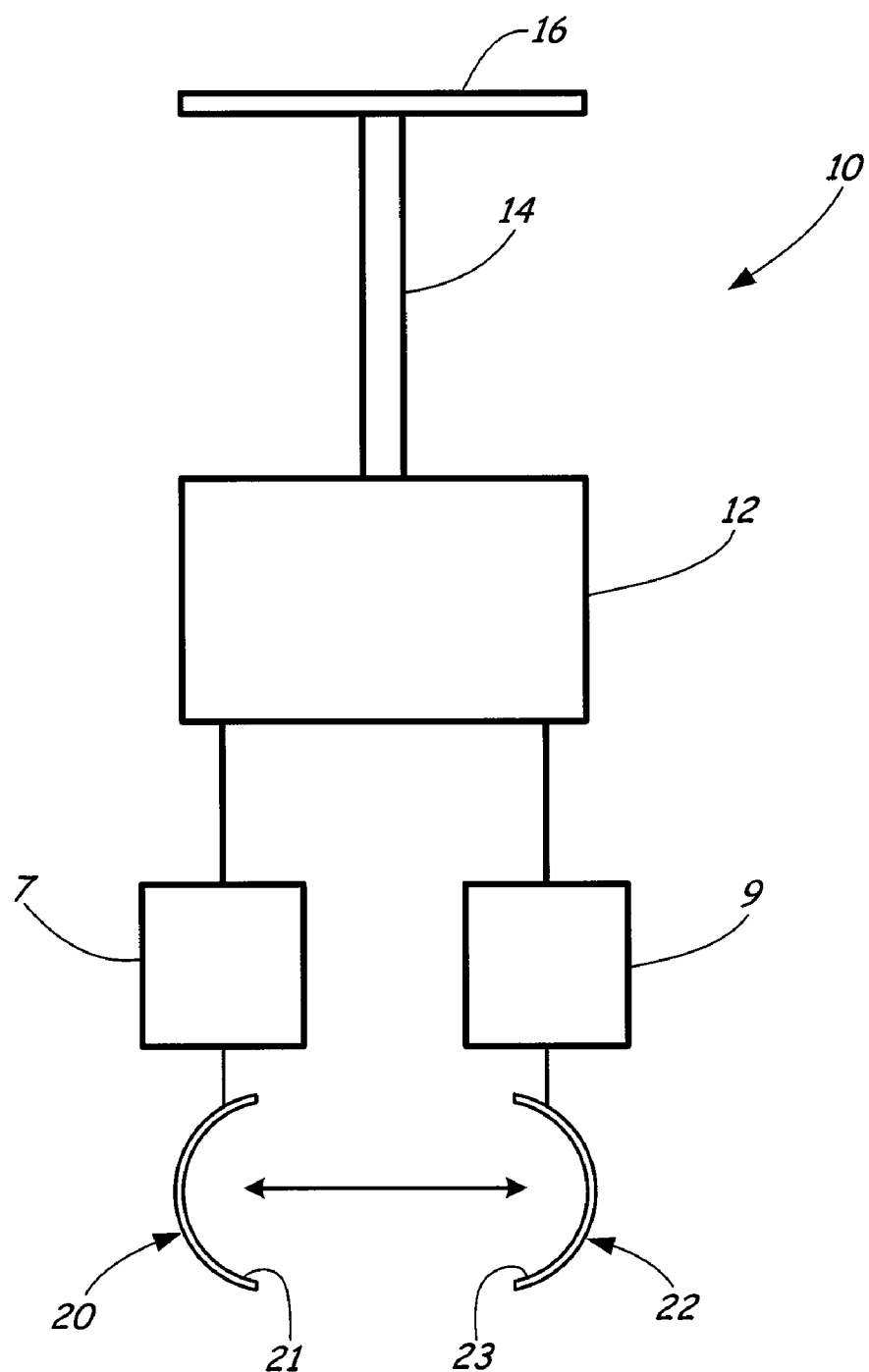
FIG. 12 is a schematic view of a clamping assembly of a clamping tool in accordance with one embodiment of the present invention.

As shown in FIGS. 1-5, and 12, the clamp assembly 12 includes a clamp base 18. The clamp base 18 is a rigid structural element having a clamp base opening 15 defined therein. A pair of moveable jaws are defined by first movable jaw 20 and a second movable jaw 22. In an alternate embodiment, a single movable jaw may be provided parallel to a relatively stationary structure or a movable structure formed as, for example, a block. As shown in FIG. 12, the opposing moveable jaws 20 and 22, via operation of linkages 7 and 9, remain parallel to one another when opening and closing. This prevents the clamped working piece from sliding out of or away from the jaws. In addition, it becomes easier to clamp the pipe because the jaws 20, 22 are positioned on opposite sides of the pipe and the force is applied to the pipe in a direction that is generally normal to the abutting surfaces of the jaws 20, 22. Portions of the first and second movable jaws 20 and 22 may be designed to be reflective during use.

One or both of the first and second jaws 20 and 22 may be provided with a moveable jaw portion for accommodating workpieces of various sizes.

Each of the first and second jaws 20 and 22 include a working surface 21 and 23 for contacting the workpiece 19. As shown, the first and second movable jaws 20 and 22 may be configured to conform to the workpiece 19. Thus, as shown, the working surfaces 21 and 23 together form a generally cylindrical shape for grasping a workpiece 19 such as a pipe.

In some embodiments, a plurality of interchangeable workpiece contacting surface members may be provided with the clamping tool 10, wherein a member or members fitting or conforming to a workpiece may be selected from the set and removeably connected to the tool 10. Thus, while generally cylindrical workpiece contacting surface members are shown, alternative shapes may be provided.

To cause the jaws to remain parallel, a "four bar linkage" may be utilized. Of course, any other suitable linkage may be utilized. The first movable jaw 20 forms one bar of the four bar linkage, and is pivotably coupled to the clamp base 18 by a top link 30 and a bottom link 32, forming two more bars of the four bar linkage. Though not clearly shown, another top link 31 and another bottom link 33 couple the first movable jaw 20 to the clamp base 18 and are located behind the assembly, as illustrated. Thus, the two top links 30, 31 form one "bar" of the "four bar linkage" and the two bottom links 32, 33 form another "bar" of the "four bar linkage." The fourth bar is formed by a portion of the clamp base 18, and is denoted as the base link 34.

Like the first movable jaw 20, the second movable jaw 22 is coupled to the clamp base 18 through a four bar linkage. Top links 24, 25 and bottom links 26, 27 are provided along with base link 28 to form the four bar linkage with second movable jaw 22.

While as shown in FIGS. 1 and 2, the movable jaws 20 and 22 are generally parallel to one another, portions of the jaws may not be parallel to each other and the workpiece contacting surfaces thereof may be parallel or move toward and away from each other in a generally straight line. In addition, the workpiece contacting surfaces may be parallel at all times or may only be parallel over a portion of their path of travel, which would include contact with the outer surface of a workpiece, e.g., a pipe, and compression of the workpiece.

As shown, a top surface 29 of each of the first and second jaws 20 and 22 contact one another. In both the open position and the closed position (seen in FIGS. 3 through 5), the top surface 29 of each of the first and second jaws 20 and 22 contact one another to form an extension between the first and second jaws 20 and 22. Thus, the tool 10 can be set down on top of or around a pipe in a relatively confined space. The congruent top surfaces 29 keep the pipe positioned between the jaws 20, 22, and in some embodiments centered between the jaws 20, 22. The congruent top surfaces 29 and the shaped working surfaces 21, 23 together and independently keep the pipe positioned. The pipe generally extends in an axial direction between the jaws 20, 22. The clamping tool 10 is brought into position in a direction normal to the pipes axial length. The congruent top surfaces 29 aid in keeping the pipe properly positioned and the arrangement of the jaws 20, 22 generally prevent the tool from moving off of the pipe and prevent the pipe from moving out of the jaws 20, 22 in cases where such movement might be possible.

To close the jaws, adjusting links 44, 46 are retracted into clamp base 18. As this occurs, the first movable jaw 20 and the second movable jaw 22 are raised. Because of the pivoting top links 30, 31, 24, 25 and the pivoting bottom links 32, 33, 26, 27, the first movable jaw 20 and the second movable jaw 22 move towards one another, while remaining generally parallel to one another (see, e.g., FIG. 12). To open the jaws, the process is reversed. That is, the adjusting links 44, 46 are extended out of the clamp base 18. This causes the jaws 20, 22 to move in a direction away from extension tube 14 and to separate from one another, while still remaining generally parallel. As shown by comparison of FIGS. 4 and 5, throughout the opening and closing movement of the jaws 20, 22, a width of the clamp base 18, defined as a dimension of the clamp base 18 in a direction substantially parallel to the jaw movement, is fixed. Again, it is not necessary that the tool be configured such that the jaws 20, 22 remain constantly parallel to one another.

Figure 3:
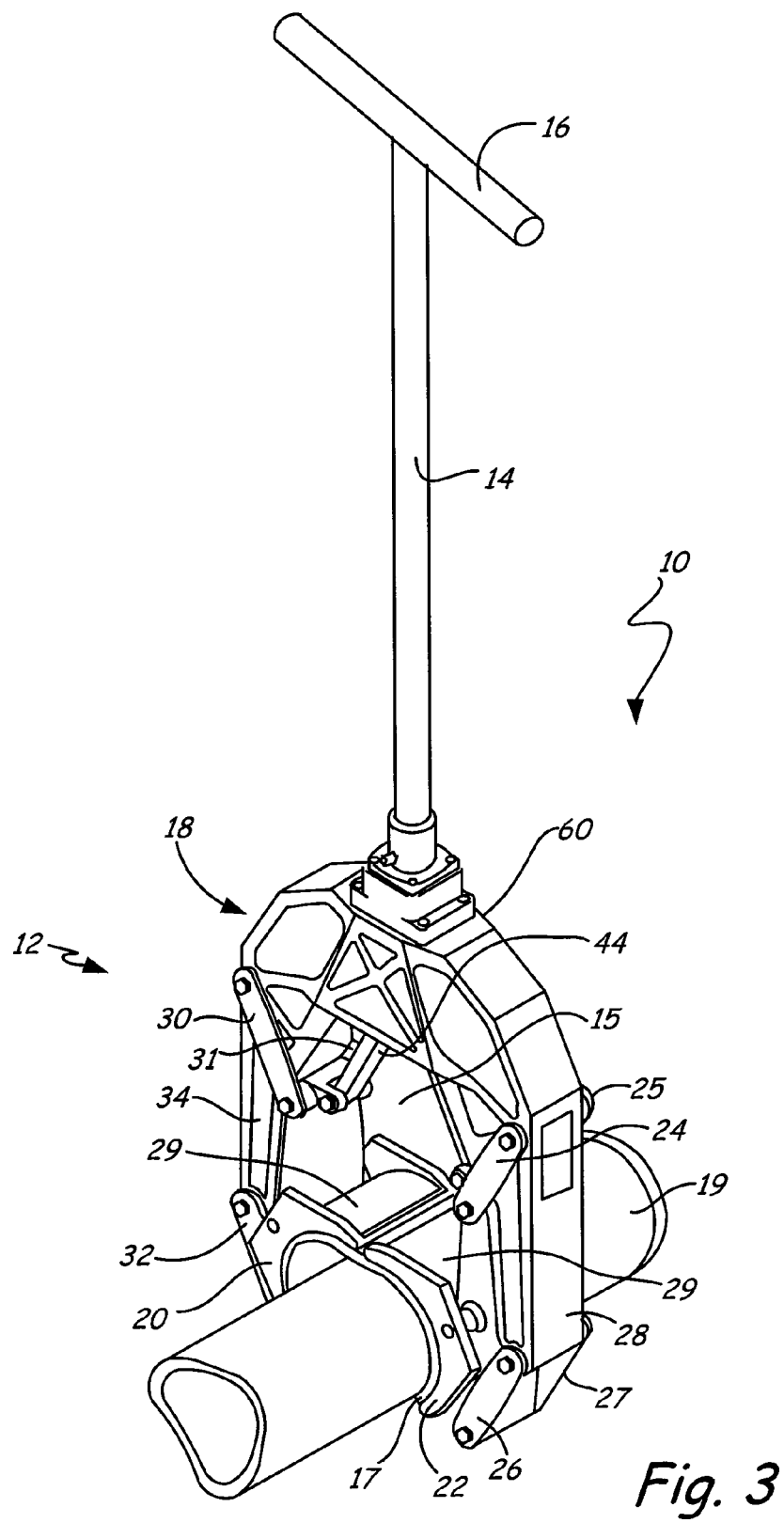
FIG. 3 is a perspective view of a clamping assembly of a clamping tool in accordance with one embodiment of the present invention in a closed position.
Figure 4:
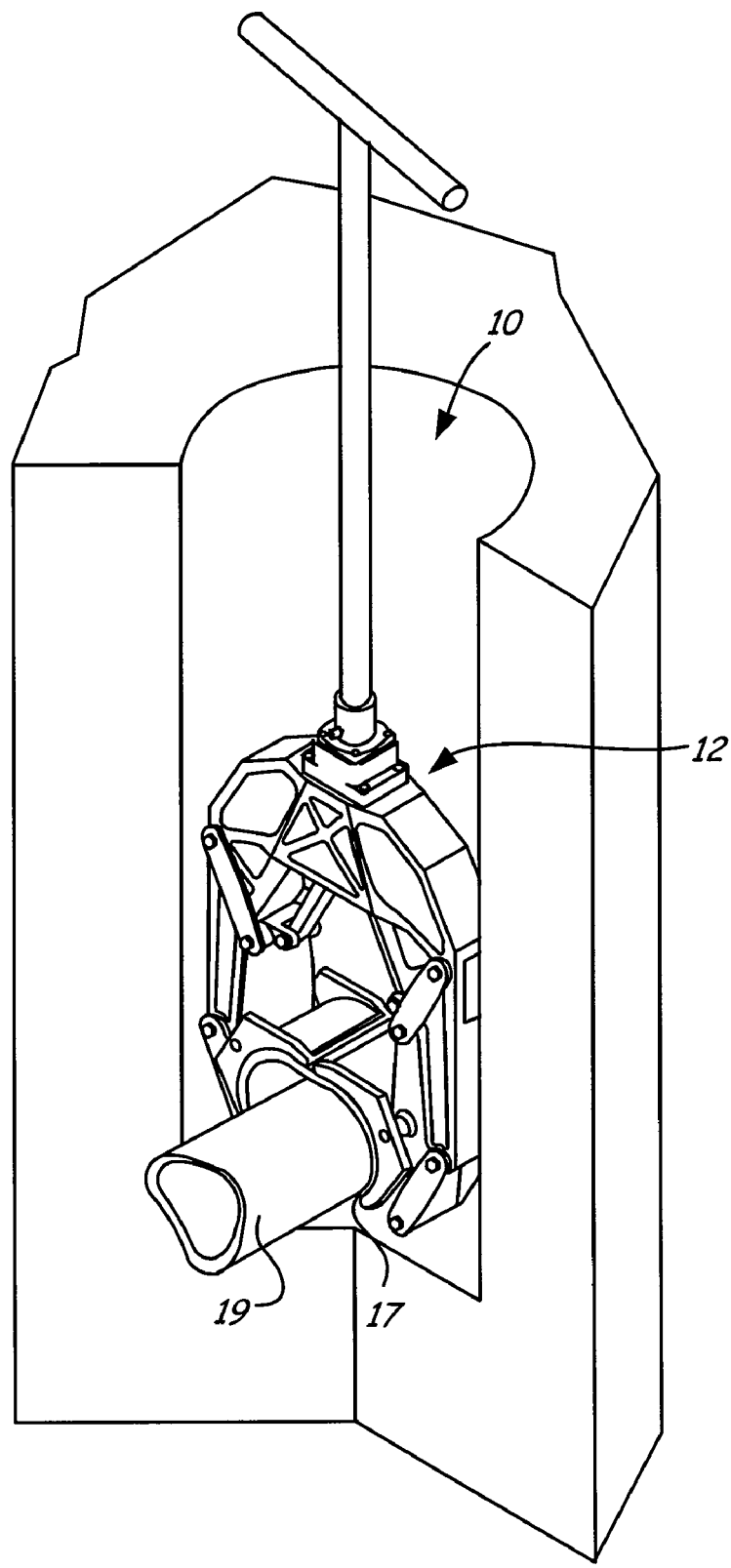
FIG. 4 is a perspective view of a clamping assembly of a clamping tool in accordance with one embodiment of the present invention in a closed position being used in a narrow access.

FIG. 3 illustrates a clamp assembly 12 with the clamping tool 10 being put into a closed position around a workpiece 19. FIG. 4 illustrates the clamp assembly with the clamping tool 10 being put in a closed position around a workpiece 19 being used in a narrow space.

Figure 5:
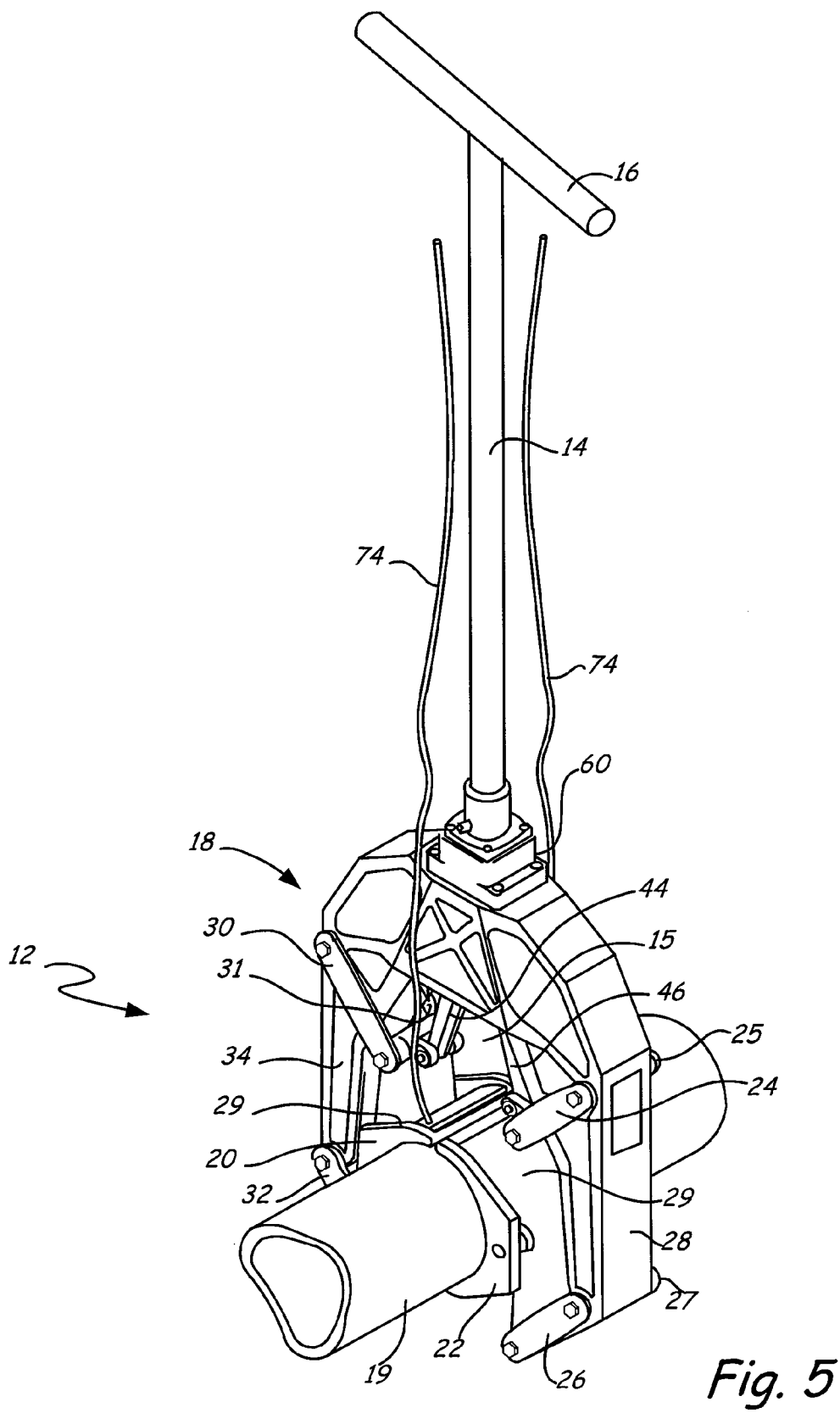
FIG. 5 is a perspective view of a clamping assembly of a clamping tool in accordance with one embodiment of the present invention in a closed position.

FIG. 5 illustrates a clamp assembly 12 with the clamping tool 10 in a closed position around a workpiece 19. First and second wires extend to the top surfaces 29 of the first and second movable jaws 20 and 22. Wires 74, to be described in more detail below, are coupled to the movable jaws 20, 22.

As shown in FIGS. 1 through 5, the clamping tool 10 may be configured such that the working portion of the tool is adapted to contact a workpiece, for example, a tube or pipe, substantially completely around its outer diameter, and to apply a selected treatment to the workpiece.

Figure 6A:
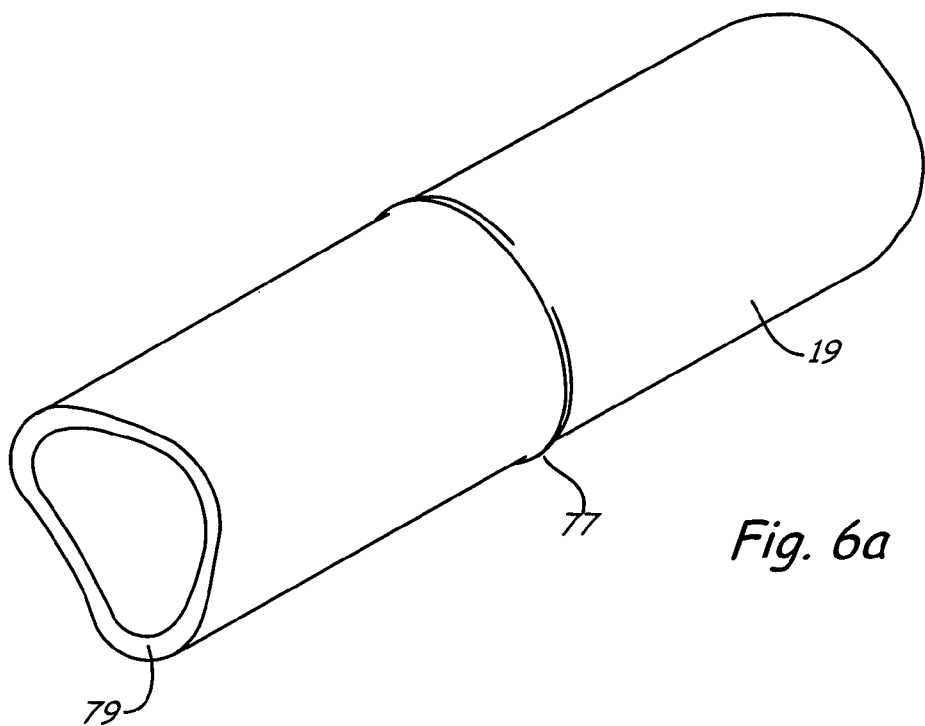
FIG. 6a is a perspective view of a workpiece with an irregular outer diameter.
Figure 6B:
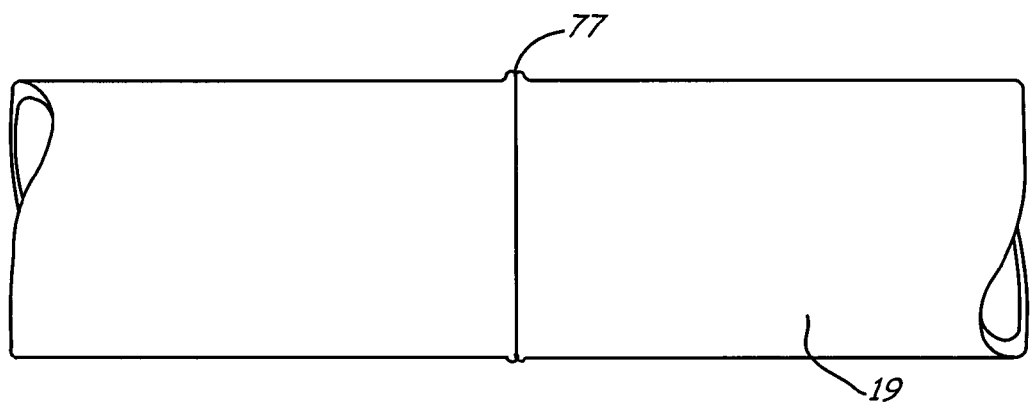
FIG. 6b is a perspective view of a workpiece comprising two sections, the workpiece having a ridge between the sections.

FIGS. 6a and 6b illustrated a workpiece 19 formed of two sections. The sections are joined at ridge 77. Additionally, FIG. 6a illustrates a workpiece 19 having an irregularly shaped outer diameter 79. A clamping tool 10 such as described with reference FIG. 1 may be used to clamp workpieces 19 having ridges 77 and/or irregularly shaped outer diameters 79. The working surfaces 21, 23 may be configured to generally conform to a cylindrical shape of a workpiece and the ridge 77 does not overly deflect the tool 10 from clamping the workpiece 10. Further, as will be described in more detail below, the tool 10 may apply a treatment to the workpiece 19. Such treatment may, for example, smooth out or minimize the ridge 77.

The tool 10 may be used to grasp a workpiece 19 having an irregularly shaped outer diameter 79 as the working surfaces 21, 23 conform generally to the shape of the outer diameter 79. It is not necessary that the working surfaces 21, 23 conform exactly to the shape of the outer diameter 79. As can be appreciated from the figures, generally cylindrically shaped working surfaces 21, 23 can snugly grasp a workpiece 19 having an irregularly shaped diameter 79 as shown in FIG. 6a. Similarly, otherwise irregularly shaped workpieces may be grasped with a tool having otherwise shaped workpiece contacting surface members as described above.

Figure 7A:
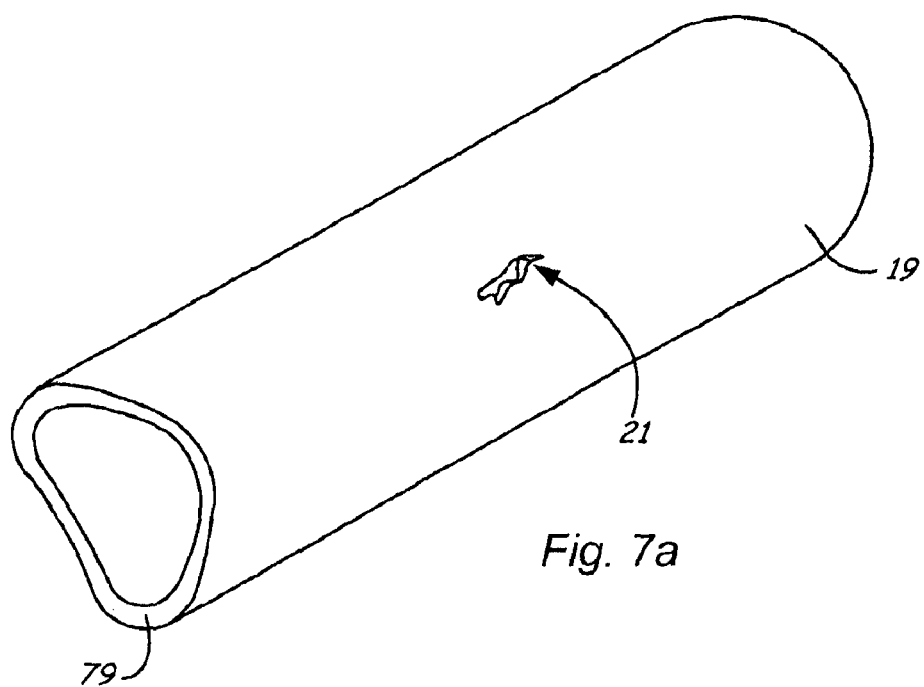
FIG. 7a is a perspective view of a workpiece having a gash in the surface thereof.
Figure 7B:
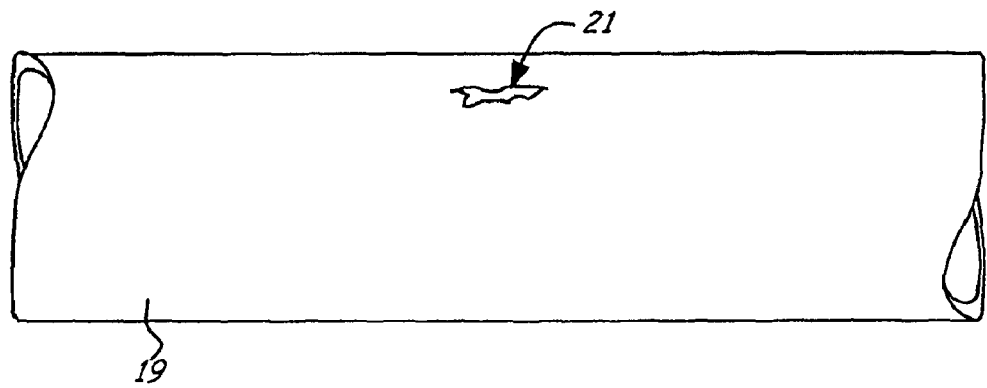
FIG. 7b is a perspective view of a workpiece having a gash in the surface thereof.
Figure 8A:
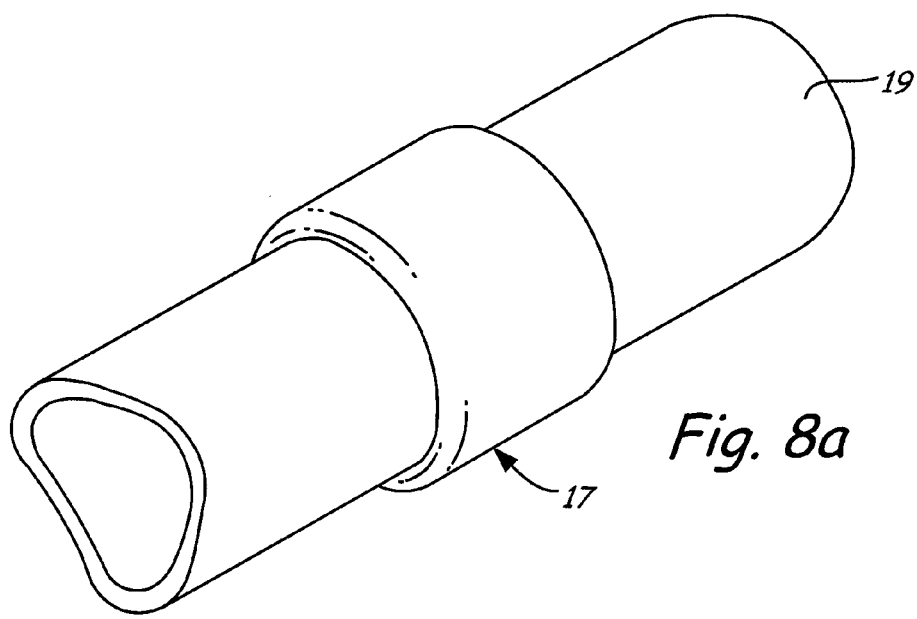
FIG. 8a is a perspective view of a workpiece with a patched section placed on the surface thereof in accordance with one embodiment of the present invention.
Figure 8B:
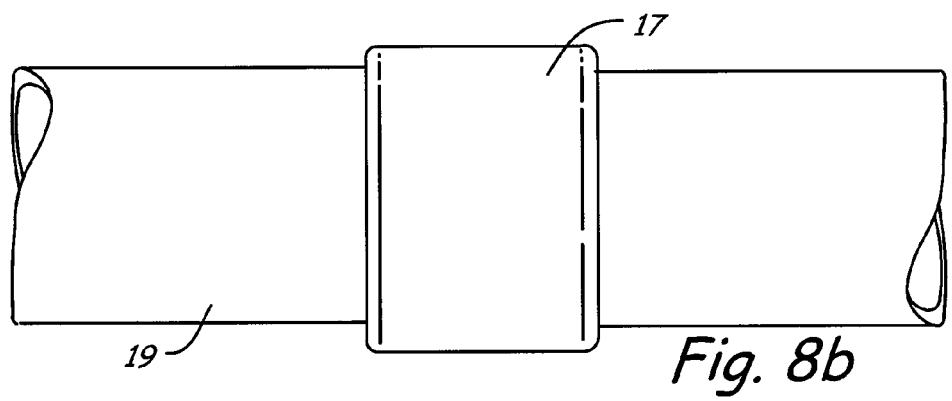
FIG. 8b is a perspective view of a workpiece with a patched section placed on the surface thereof in accordance with one embodiment of the present invention.
Figure 8C:
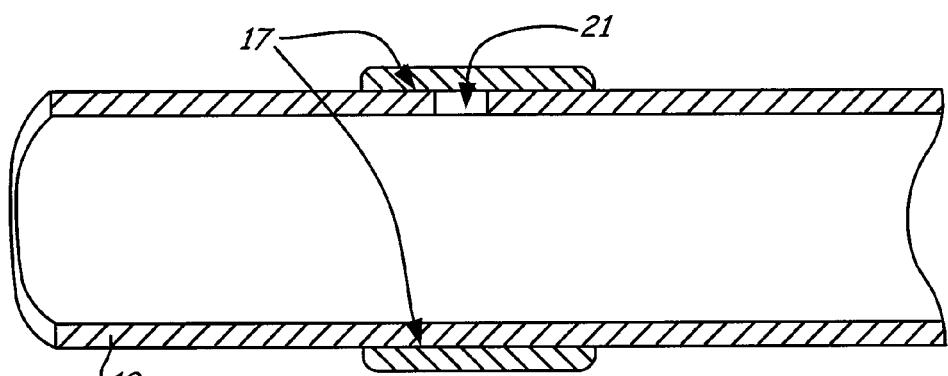
FIG. 8c is a cross-sectional view of a workpiece with a patched section placed on the surface thereof, sealing a gash in the surface of the workpiece, in accordance with one embodiment of the present invention.

FIGS. 7a and 7b illustrate perspective views of a workpiece 19 having a gash 21 in the surface thereof. Further, FIG. 7a illustrates a workpiece 19 having an irregularly shaped outer diameter 79. As shown in FIGS. 1 through 4, the clamping tool 10 may be used to apply a treatment 17 over the gash 21 of the workpiece 19. FIGS. 8a through 8c illustrate a treatment 17 placed over the gash 21 of the workpiece 19. The treatment 17 shown in FIGS. 8a through 8c is a collar. The collar may, for example, include a patch element. The patch element is designed such that it bonds securely to the workpiece 19 and seals the gash 21. Alternatively, other treatments such as heating, melting, joining, sealing, severing, compressing, deposition of a like or different material, etc. may be applied to the workpiece 19 by the clamping tool 10.

FIGS. 1 through 5 illustrate the application of the treatment 17 to the workpiece 19, from being carried into place by the tool and compressed around the workpiece 19.

In some embodiments, the workpiece contacting surfaces 21, 23 of the tool 10 may be adapted to deliver a chemical treatment or patch to a workpiece. FIG. 1 illustrates various structures for delivering a treatment to a workpiece. A gel or patch 80 may be provided on the working surface 21 of either or both movable jaws 20, 22. A quick release coating, easy release type adhesive, or other to deliver or apply a chemical or other treatment to a workpiece may be provided.

Alternatively, or additionally, the tool 10 may include structures, such as wires 74, shown in FIGS. 1 and 5 for delivering electricity, heat or other forms of energy to the too, portions thereof, the workpiece and/or a patch by carrying suitable internal or external heating or energy producing and/or transmitting elements. Thus, wires 74 may be used to deliver heat to the working surfaces of the tool. The working surfaces may become warm and subsequently warm the workpiece. Referring to FIGS. 6a and 6b, the malleability of the workpiece 19 may be increased due to the warmth delivered via the wires 74. The working surfaces 21, 22 may be used to compress the workpiece 19 in the area of the ridge 77 to minimize the ridge 77. The malleability of the workpiece 19 due to the warmth enhances the tool's ability to minimize the ridge 77. Alternately, the tool 10 may be used to minimize the ridge 77 without application of heat or other energy to the workpiece 19.

Further, the tool 10 may be provided with sensors, e.g., shown at 82 of FIG. 1, to measure and/or display the amount of pressure, heat or other treatment being applied to a workpiece. Alternatively, sensors 82 may be provided for measuring other characteristics.

Figure 9:
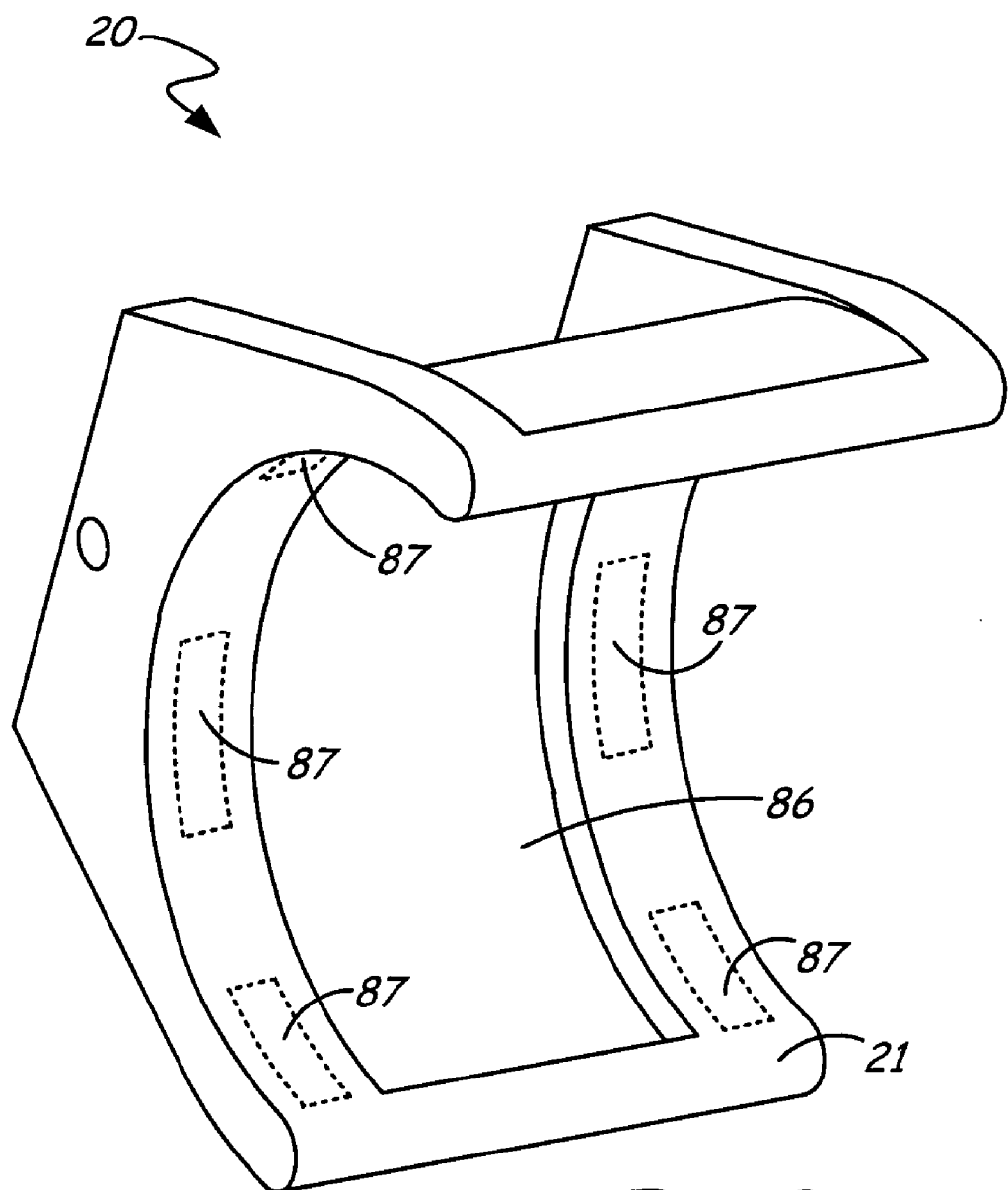
FIG. 9 illustrates a movable jaw provided with a treatment structure in accordance with one embodiment of the present invention.

FIG. 9 illustrates one embodiment a treatment delivery structure in accordance with a further embodiment of the present invention. The working surface 21 of a jaw, here the first jaw 20, is provided with a recess or relieved region 86. The relieved region 86 may be adapted to receive a chemical, in liquid, solid, or semi-solid form, to be applied to a workpiece. The relieved region 86 may extend over substantially the entire working surface of the jaw or may extend over only a portion of the working surface of the jaw.

The relieved region 86 may be surrounded by heating elements 87, which may also take the form of treatment elements, e.g., sonic horns. The selected types of elements 87 may alternately underlie or be adjacent to the relieved region 86. Also, in some embodiments, the elements 87 may be used in a jaw without a relieved region 86 in conjunction with a material to be applied to a workpiece 19. The elements 87 may be arranged in any suitable pattern depending on the treatment effect desired. Further, a single element 87 may be arranged under substantially all of the working surface of the jaw.

Figure 10:
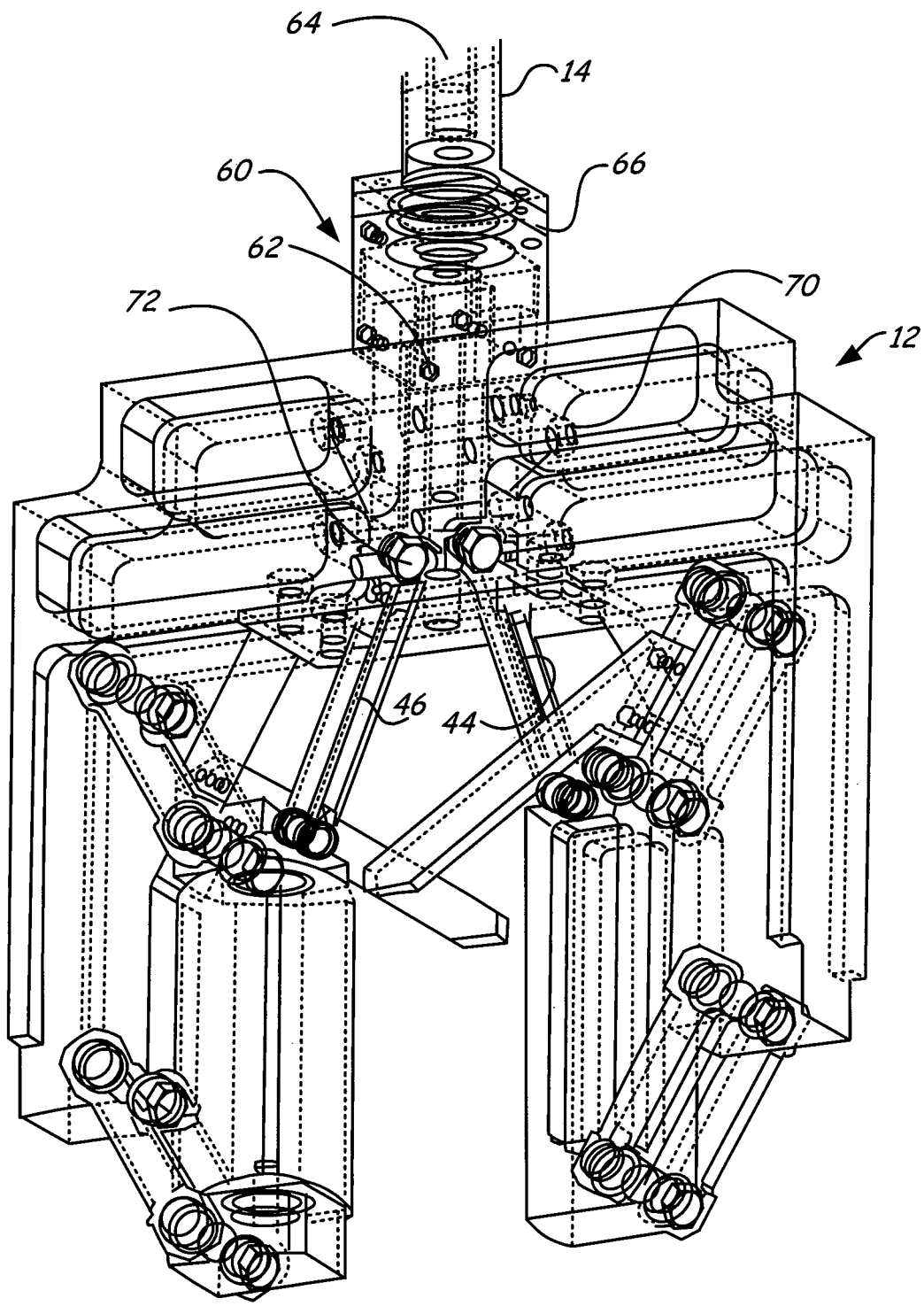
FIG. 10 illustrates a sectional view of a clamping assembly of a clamping tool in accordance with one embodiment of the present invention in an open position.

Various mechanisms may be employed to translate a rotational movement of the handle 16 into a force that extends and retracts the adjusting links 44, 46. Further, a rotational movement of the handle 16 is not necessary in accordance with the present invention. FIG. 10 illustrates one example of a mechanism to translate a rotational movement of the handle into a force that extends and retracts the adjusting links. Thus, a clamping tool 10 is shown wherein a threaded rod 64 is provided within a bearing assembly 60 that is coupled with extension tube 14. The threaded rod 64 need only have threads over a portion of the rod and is coupled at one end with the handle 16. The threaded rod 64 passes through a threaded nut 66, so that rotational movement is translated into linear movement. The threaded rod 64 is coupled with a slider 62. The slider 62 is pivotably connected to both the adjusting links 44, 46 at couplings 70, 72 respectively. Thus, when threaded rod 64 is rotated within threaded nut 66, linear motion results, causing the slider 62 to move axially relative to the clamp base 18; that is, parallel to the longitudinal axis of the extension tube 14 (up or down as illustrated). As it moves down it moves the actuating links 44, 46 out of the clamp assembly 12. This motion causes the jaws 20, 22 to open, as previously described. As the slider 62 is moved up, the adjusting links 44, 46 are pulled into the clamp assembly 12. This causes the jaws 20, 22 to close. Because the adjusting links 44, 46 are pivotably coupled between the slider 62 and the jaws 20, 22, they come together within clamp assembly 12. As an alternative to the embodiments shown in FIGS. 1-5 and 9, movable jaws 20, 22 may comprise a mandrel block and a rotating sleeve. Further, the first and second movable jaws may be provided with working surfaces generally conforming to a workpiece.

Figure 11:
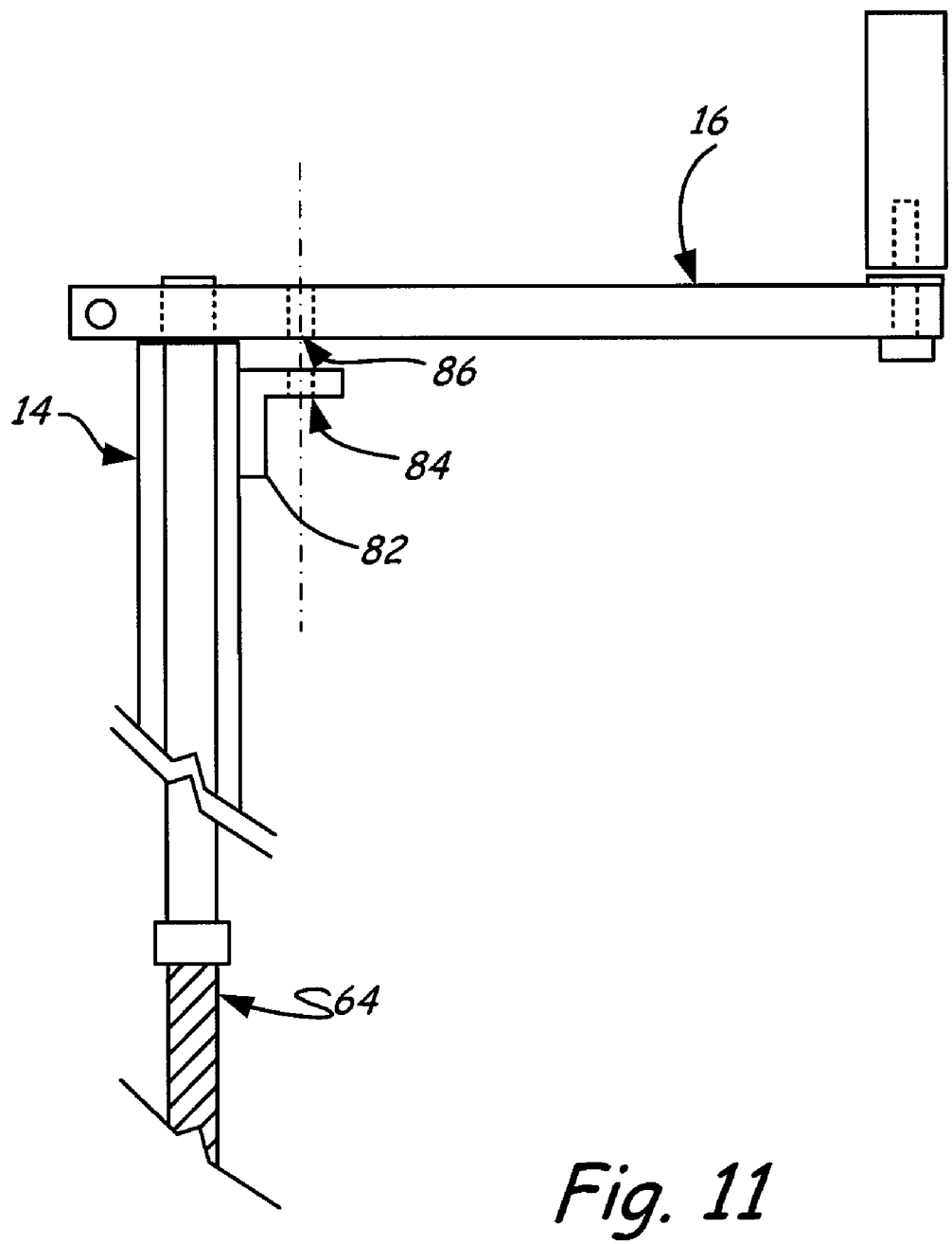
FIG. 11 illustrates a schematic view of a handle assembly with a threaded rod in accordance with one embodiment of the present invention.

FIG. 11 illustrates a handle 16 as it is coupled to the threaded rod 64 in accordance with one embodiment of the present invention. Suitable mechanisms other than threaded structures may be used to operate the tool of the present invention. For example, as known to those skilled in the art, a ratchet arrangement or a rack and pinion system may alternately be used. In a threaded arrangement, as shown in FIG. 11, an angled bar 82 may be attached to the extension tube 14. The angled bar 82 includes a lower locking hole 84 that can be aligned with an upper locking hole 86 bored through handle 16. When the two holes 84, 86 are aligned a locking member such as a padlock or any securing member can be passed through both holes 84, 86 and essentially lock the clamping tool 10. When the clamping tool 10 is locked after a pipe has been sealed, the lock will prevent the clamping tool 10 from accidentally or unintentionally being opened. Of course, other suitable handle assemblies may be used with clamping tools in accordance with the present invention.

Although the present invention has been described with reference to preferred embodiments, persons skilled in the art will recognize that changes may be made in form and detail without departing from the spirit and scope of the invention.

What is claimed is:

1. A tool for use on a generally tubular workpiece, said tool comprising:
   a clamp base having an opening;
   a first jaw coupled to the clamp base with a first linkage, at least a portion of the first jaw being moveable within the opening, the first jaw comprising a first generally semi-cylindrical portion having a substantially smooth, first curvilinear workpiece contacting surface shaped to complement a selected generally tubular workpiece and bounded by edges, and a first top surface;
   a second jaw coupled to the clamp base with a second linkage, at least a portion of the second jaw being moveable within the opening; the second jaw comprising a second generally semi-cylindrical portion having a substantially smooth, second curvilinear workpiece contacting surface shaped to complement the selected generally tubular workpiece and bounded by edges, and a second top surface; wherein
   the first top surface is contiguous with at least a portion of the second top surface substantially throughout movement of the first and second jaws within the opening;
   either or both of the first and second jaws carries a gel or patch to be applied to the selected workpiece;
   the first and second jaws are movable within the opening such that, collectively, the first and second workpiece contacting surfaces contact the selected workpiece substantially completely around the outer diameter of the selected workpiece; and
   the clamp base has a width in a direction substantially parallel to the movement of the jaws, and said width is fixed throughout movement of the jaws.

2. The tool of claim 1, wherein the clamp assembly is generally U-shaped, and the first and second jaws are disposed proximate an open end of the U-shaped clamp assembly.

3. The tool of claim 1, wherein the first jaw defines a first top edge and a first bottom edge, and the second jaw defines a second top edge and a second bottom edge, and wherein the first top edge is contiguous with at least a portion of the second top edge throughout movement of the first and second jaws within the opening.

4. A pipe clamping tool comprising:
   a clamp assembly comprising a clamp base, a clamp base opening, a handle, and one or more adjusting links operatively coupled to the handle such that the adjusting links are extendable from and retractable toward the clamp base via movement of the handle;
   a first jaw coupled with the clamp base with a first linkage, the first jaw comprising a first generally semi-cylindrical portion having a substantially smooth, first curvilinear workpiece contacting surface shaped to complement a selected generally tubular workpiece;
   a second jaw coupled with the clamp base with a second linkage, the second jaw comprising a second generally semi-cylindrical portion having a substantially smooth, second curvilinear workpiece contacting surface shaped to complement the selected generally tubular workpiece, wherein
   the one or more adjusting links are operatively coupled to the first and second jaws and the first and second linkages such that a first movement of the handle is converted into a linear movement of the adjusting links in a first direction that causes a space between the first and second jaws to diminish, and a second movement of the handle is converted into linear movement of the adjusting links in a second direction that causes the space between the first and second jaws to increase;
   either or both of the first and second workpiece contacting surfaces carries a gel or patch to be applied to the selected workpiece;
   the first and second jaws are movable within the clamp base opening such that, collectively, the first and second workpiece contacting surfaces contact the selected workpiece substantially completely around the outer diameter of the selected workpiece; and
   the clamp base has a width in a direction substantially parallel to the movement of the jaws, and said width is fixed throughout movement of the jaws.

5. The pipe clamping tool of claim 4, wherein each of the first and second jaws is movable with respect to the other jaw.

6. The tool of claim 4, further comprising means for locking the tool in a workpiece contacting position.

7. The tool of claim 4, wherein the clamp assembly is generally U-shaped, and the first and second jaws are disposed proximate an open end of the U-shaped clamp assembly.

8. A tool for use on a generally tubular workpiece, the tool comprising:
   a handle assembly including an extension tube and a handle; and
   a clamping assembly operably coupled with the handle assembly, the clamping assembly comprising:
   a substantially rigid structural U-shaped clamp base having a bridge portion and first and second leg portions extending therefrom defining a U-shaped opening therebetween, the bridge portion have a handle side opposite the opening and a jaw side bordering the opening;
   a first jaw coupled to the first leg of the clamp base with a first linkage, at least a portion of the first jaw being moveable within said opening, the first jaw comprising a first generally semi-cylindrical portion having a substantially smooth, first curvilinear workpiece contacting surface shaped to complement a selected generally tubular workpiece, the first curvilinear workpeice contacting surface being bounded by two semi-circular opposite edges and two substantially straight opposite edges extending between the two semi-circular opposite edges, one of the substantially straight opposite edges being radiused to form a first top surface transitioning from the workpiece contacting surface to a backside of the first jaw;
   a second jaw coupled to the second leg of the clamp base with a second linkage, at least a portion of the second jaw being moveable within said opening, the second jaw comprising a second generally semi-cylindrical portion having a substantially smooth, second curvilinear workpiece contacting surface shaped to complement the selected generally tubular workpiece, the second curvilinear workpeice contacting surface being bounded by two semi-circular opposite edges and two substantially straight opposite edges extending between the two semi-circular opposite edges, one of the substantially straight opposite edges being radiused to form a second top surface transitioning from the first curvilinear workpiece contacting surface to a backside of the second jaw; and adjusting links operably coupled to the extension tube of the handle assembly and to the first and second jaws;

wherein:

the extension tube is coupled to the handle side of the bridge portion of the clamp assembly wherein rotation of the extension tube causes substantially linear motion of the adjusting links thereby actuating the jaws; and a portion of the first top surface is in contact with a portion of the second top surface and the contact therebetween defines a pivot point of the jaws.

9. The tool of claim 8, further comprising means for locking the tool in a workpiece contacting position.

10. The tool of claim 8, wherein the handle is removably coupled to the extension tube.

11. The tool of claim 8, wherein the adjusting links are extendable into the bridge portion of the clamp assembly.

* * * * *